United States Patent
Marquez Llinas et al.

(10) Patent No.: US 10,677,699 B2
(45) Date of Patent: Jun. 9, 2020

(54) WEAR SENSOR AND THE CORRESPONDING WEAR ELEMENT, ASSEMBLY AND USE

(71) Applicant: METALOGENIA RESEARCH & TECHNOLOGIES S.L., Barcelona (ES)

(72) Inventors: Jordi Marquez Llinas, Barcelona (ES); Joan Cesar Galobardes, Barcelona (ES); Nil Vallve, Barcelona (ES); Jorge Triginer Boixeda, Barcelona (ES); Cristian Toral Martin, Barcelona (ES); Albert Puig Castello, Barcelona (ES); Enric Camprubi Torras, Barcelona (ES)

(73) Assignee: METALOGENIA RESEARCH & TECHNOLOGIES S.L., Barcelona (ES)

( * ) Notice: Subject to any disclaimer, the term of this patent is extended or adjusted under 35 U.S.C. 154(b) by 319 days.

(21) Appl. No.: 15/746,891

(22) PCT Filed: Jul. 24, 2015

(86) PCT No.: PCT/ES2015/070574
§ 371 (c)(1),
(2) Date: Jan. 23, 2018

(87) PCT Pub. No.: WO2017/017289
PCT Pub. Date: Feb. 2, 2017

(65) Prior Publication Data
US 2020/0088617 A1    Mar. 19, 2020

(51) Int. Cl.
G01R 31/00    (2006.01)
G01N 3/56    (2006.01)
E02F 9/26    (2006.01)

(52) U.S. Cl.
CPC ............... *G01N 3/56* (2013.01); *E02F 9/264* (2013.01); *E02F 9/267* (2013.01); *G01N 2203/06* (2013.01)

(58) Field of Classification Search
USPC .................................. 324/303, 339, 366, 712
See application file for complete search history.

(56) References Cited

U.S. PATENT DOCUMENTS 4,744,242 A    5/1988  Anderson et al.
4,945,770 A    8/1990  Birger
(Continued)

FOREIGN PATENT DOCUMENTS

AU    2006254651 B2    4/2012
DE    4312354 C1    6/1994
(Continued)

OTHER PUBLICATIONS

International Search Report, PCT/ES2015/070574, dated Apr. 7, 2016.

*Primary Examiner* — Vincent Q Nguyen
(74) *Attorney, Agent, or Firm* — Porzio Bromberg & Newman P.C.

(57) ABSTRACT

Wear sensor and the corresponding wear element, assembly and use. The sensor is intended for a wear element in a bucket of an earth moving machine. The sensor includes a sensing electric circuit and at least one elongated arm (23) extending in a direction of detection defining a longitudinal axis. The arm (23) has a base (25) and an end. The end wears away together with the wear material of the wear element. The arm (23) includes a plurality of electrical connections (27) forming part of the sensing electric circuit and extending different lengths with respect to one another, measured according to the longitudinal axis along the arm (23).

18 Claims, 9 Drawing Sheets

(56) References Cited

U.S. PATENT DOCUMENTS

| | | |
|---|---|---|
| 2007/0163325 A1 | 7/2007 | Radzisewski |
| 2013/0049935 A1* | 2/2013 | Miller ................... H04Q 9/00 340/10.1 |
| 2014/0103940 A1 | 4/2014 | Izrailit et al. |
| 2015/0035673 A1 | 2/2015 | Miller |
| 2015/0081177 A1 | 3/2015 | Kawasaki et al. |
| 2015/0149049 A1* | 5/2015 | Bewley ................ E02F 9/2816 701/50 |

FOREIGN PATENT DOCUMENTS

| | | |
|---|---|---|
| EP | 1058106 A1 | 12/2000 |
| EP | 2883999 A1 | 6/2015 |
| JP | 2004074393 A | 3/2004 |
| JP | 2008164377 A | 7/2008 |
| WO | 20120107848 | 8/2012 |

* cited by examiner

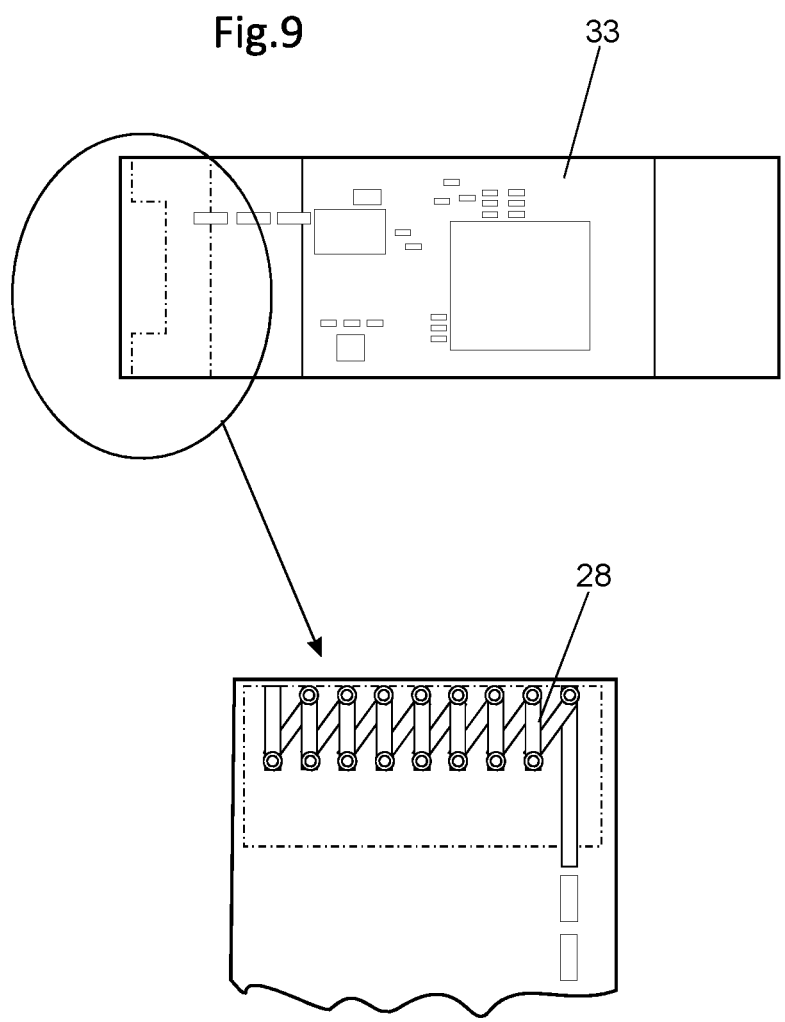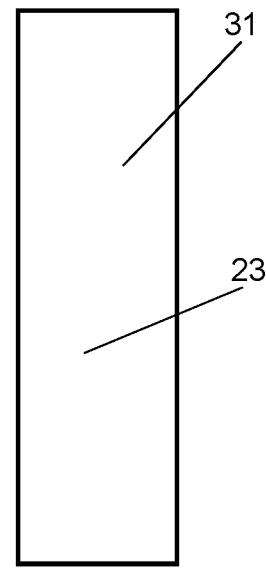

WEAR SENSOR AND THE CORRESPONDING WEAR ELEMENT, ASSEMBLY AND USE

FIELD OF THE INVENTION

The invention relates to a wear sensor for a wear element in a bucket of an earth moving machine. It is also suitable for dredging vessels provided with cutting heads that excavate, transport and deposit material from submerged areas.

The invention also relates to a wear element of a bucket of an earth moving machine with a sensor according to the invention as well as to an assembly formed by the mentioned wear element and the corresponding support or adapter, where the wear element has a rear end suitable for being assembled on the support and the support has a front end suitable for being assembled on the wear element, where the rear end of the wear element has an inner surface which, in the assembled position, is facing an inner surface of the front end of the support.

The invention also relates to use of a wear sensor according to the invention.

STATE OF THE ART

Earth moving machines are used in excavation work, demolition work, construction work, mining work, dredging work and similar activities. The bucket or shovel usually has a plurality of wear elements protecting it from wear and impacts and/or improving soil penetration, such as for example, teeth, supports or adapters and/or protectors (front and side). However, the wear elements do in fact wear away so it is necessary to replace them periodically.

Large earth moving machines, particularly those operating in quarries and mines, are essential for production in said sites. To that end, the downtime of these machines can very significantly affect the productivity thereof. A missing, broken or worn wear element will require stopping the machine to assemble another wear element, resulting in wasted production time. In this sense, it is of interest to be able to predict the remaining service life of a wear element in order to try to make the replacement of the wear element to coincide with the shutdown of the machine due to other reasons, as well as to replace the wear element before it is worn beyond the limit for which it has been designed (which may cause the wear element to fall off, failure and/or the damage of other elements that the wear element must protect).

The working conditions of the wear elements are particularly demanding, with high mechanical requirements, vibrations, blows and high temperatures (more than 100° C. and even more than 200° C. in some areas).

The inclusion of presence detectors, for example by means of RFID (radio-frequency identification) tags, is known which, however, is a system that is only suitable for detecting the presence of the wear element and not its level of wear. Furthermore, they usually present problems if they are to work at high temperatures. Other systems use artificial vision techniques.

Systems which allow detecting the level of wear by means of including marks or openings in the wear element are also known. However, these systems require the operator to physically inspect the wear elements.

BRIEF DESCRIPTION OF THE INVENTION

The object of the invention is to overcome these drawbacks. This purpose is achieved by means of a wear sensor of the type indicated at the beginning, characterized in that it comprises a sensing electric circuit and at least one elongated arm extending in a direction of detection defining a longitudinal axis, where the elongated arm has a base and an end, where the end is suitable for being worn together with the wear material of the wear element, and where the elongated arm comprises a plurality of electrical connections forming part of the sensing electric circuit and extending different lengths with respect to one another, measured according to the longitudinal axis along the arm.

In fact, the wear elements have a portion of wear material already designed and envisaged for being worn. In other words, it is a portion of the part that will gradually wear away over time and will therefore be physically eliminated from the part. The sensor according to the invention has a sensing electric circuit, a portion of which (the arm) extends towards the area of the part which is envisaged to be eliminated by wear. The arm of the sensor has the end thereof housed in this area of the part which will be eliminated and, therefore, during subsequent use of the wear element, the end of the sensor arm will also be eliminated. As a result, the electrical connections arranged in the arm will be physically eliminated, which will cause the corresponding circuits to remain open. Since there is a plurality of electrical connections extending different lengths with respect to one another in the direction of the longitudinal axis (i.e., extending towards the end of the arm to a greater or lesser extent), these electrical connections will be interrupted sequentially as the wear of the wear element gradually progresses and, as a result, the end of the arm of the sensor is gradually cut away. Therefore, a detection circuit will be able to detect which electrical connection or connections are interrupted and, as a result, will be able to know until what point the wear of the arm and, as a result, of the wear element has progressed.

The sensing electric circuit is preferably arranged on a printed circuit board (PCB). The sensing electric circuit is advantageously formed by passive elements (resistances, coils and/or capacitors) since these elements are those that best withstand high temperatures. Additionally, it will comprise a series of electrical connections between them, in the form of tracks made of conductive material arranged on the printed circuit board. Some of these electrical connections are those which can be elongated such that they extend along the arm different lengths with respect to one another, such that when the arm gradually wears these electrical connections are gradually interrupted in a staggered manner. Therefore, a detection circuit will be able to detect the failure of each of these electric conductions and detect, based on same, the wear progress of the wear element. To that end, the detection circuit sends a pre-established electric signal to the sensing electric circuit and measures and analyzes the response signal received from the sensing electric circuit.

The arm is preferably embedded in a mass of polymeric material. In fact, the wear sensor will be subjected to very demanding working conditions, due to the environment characteristic of the wear element. Particularly, the arm will be exposed to the outside. For the arm to wear away together with the rest of the wear element and to not undergo other damages due to this aggressive working environment, it is advantageous for the latter to be embedded in a mass of polymeric material which protects it and which furthermore allows fixing the sensor to the wear element. The mass of polymeric material is preferably a bi-component silicone elastomer, combining low thermal conductivity with high elastic properties, giving good flexibility to the assembly, better absorbing the mechanical requirements to which it is subjected. A commercial example of bi-component silicone elastomers suitable for the carrying out the present invention is the product having the brand name SYLGARD® 170, marketed by Dow Corning®.

In principle, the arm can have any shape, provided that it extends at least in a direction which is the direction to be controlled as wear progression indicator. It is the direction which has been considered defining the mentioned longitudinal axis. In practice, and given the existing space limitations, the arm will be as small as possible in the directions in which measuring the wear is not of interest, so it will have a configuration that is substantially elongated (in the direction of the longitudinal axis) and narrow perpendicular to the longitudinal axis. In any case, the wear area to be measured will be different for each application (type of wear element involved, specific design thereof, type of soil that must be worked on, etc.).

Advantageously, the elongated arm has between 3 and 7 of the mentioned electrical connections extending different lengths with respect to one another along the arm, measured according to the longitudinal axis. In fact, in a strict sense a sensor having a single electrical connection in the elongated arm may be enough. For example, the electrical connection could be arranged in what would correspond to the maximum wear envisaged for the wear element. The moment in which the part must be changed could therefore be detected. However, since there is a complete sensor, i.e., with all the remaining components to be completely operative, it is useful for there to be more than one electrical connection in the arm, since in this manner not only the moment for changing the worn wear element can be detected but the wear progression can also be detected, which allows, for example, predicting when the part must be changed. In this sense, the existence of at least 2 electrical connections, and preferably between 3 and 7 electrical connections, has shown to be the best combination as it allows sufficient resolution at a low cost. However, considering alternative solutions with more connections is completely possible.

The sensor can be conceived with two different strategies. In one case, the sensor can be a monoblock sensor, such that a single printed circuit board already integrates all the elements necessary for performing sensor functions. In this case, the printed circuit board will already include a detection circuit suitable for detecting the failure of each of the electrical connections arranged in the arm. This alternative allows carrying out a more compact and cost-effective sensor. Furthermore, the sensor only requires changes to be made in the tooth, so it can be assembled on conventional supports or adapters and/or can be used in teeth that are directly assembled on the lip of the bucket. The sensing electric circuit and the detection circuit are simpler and the presence of wireless communication means (as will be described below) is not necessary. However, it also has some drawbacks: the sensor as a whole is subjected to high temperatures characteristic of the wear element, the service life of the sensor is the actual service life of the wear element, etc.

The sensor preferably also comprises a data transmission circuit with a radio-frequency emitter. In fact, information relating to the wear of the wear element can therefore be transmitted outwardly, for example, to a control system which can be arranged in the cab of the excavating machine. This control system can in turn be connected through 3G, the Internet or satellite to a headquarters which can manage the obtained data located far from the working area of the machine.

Advantageously, the radio-frequency emitter emits in a frequency comprised between 50 MHz and 990 MHz, preferably between 150 MHz and 950 MHz and very preferably at 433 MHz. In fact, it must be taken into account that the sensor is arranged in a completely metallic environment and it is indeed housed inside metal parts. This greatly complicates communications through radio-frequency. However, it has been observed that the indicated frequencies can be transmitted through the spaces and clearances characteristic of the wear elements and, generally, of the elements arranged in the buckets of the excavating machines. Therefore, communication with radio-frequency can be established without having to place antennas outside the wear element, which would expose them to the aggressive environment of the wear element.

In the case of a monoblock sensor, it is particularly advantageous that the electrical connections are part of a plurality of resistive circuits connected in parallel to one another, where the detection circuit is suitable for detecting voltage drop in terminals of the plurality of resistive circuits. In fact, this solution is particularly cost-effective and easy to implement.

The other strategy consists of designing the sensor such that it is formed in two physically independent parts or portions. In this second case, the first portion is the portion comprising the elongated arm whereas the second portion is arranged outside the wear element and is the portion including the detection circuit. The first portion further comprises wireless interconnection means. The second portion in turn further comprises the data transmission circuit and second wireless interconnection means suitable for establishing a wireless connection with the wireless interconnection means. In other words, the wireless connection means and the second wireless connection means are those which allow establishing a connection between the two portions of the sensor, particularly between the sensing electric circuit and the detection circuit. This alternative allows housing the detection circuit, the transmission circuit and, particularly, the battery, in a place having a lower temperature. On the other hand, it allows better use of these components of the sensor, since they can be used for a plurality of successive wear elements. The first portion of the sensor in turn contains only elements much more resistant to temperature. As a counterpart, wireless interconnection means is required, and the support or adapter (or generally the place in which the wear element will be assembled) must be adapted to enable including the second portion of the sensor.

Both in the case of a monoblock sensor and in the case of a sensor formed by two physically independent parts or portions, it is advantageous for the sensor to be housed in a capsule made of a polymeric material (a single capsule in the case of the monoblock sensor or two capsules, one for each portion of the sensor formed in two parts). The polymeric material of the capsule is preferably a semicrystalline aliphatic polyamide, and it is particularly advantageous that it is PA 66, i.e., poly[imino(1,6-dioxohexamethylene)iminohexamethylene], of general formula:

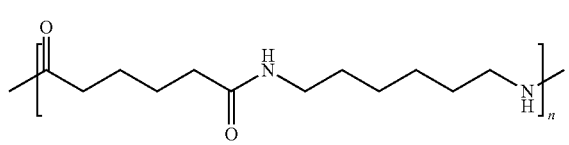

PA 66 has high rigidity, high melting point and dimensional stability. It furthermore has low moisture absorption, so it allows being designed with closer tolerances. It also has high tensile strength and is wear resistant, and it is a material that can be adhered and welded. Another advantageous alternative is that the material is PEEK (polyether ether ketone), specifically the compound obtained from the following reaction:

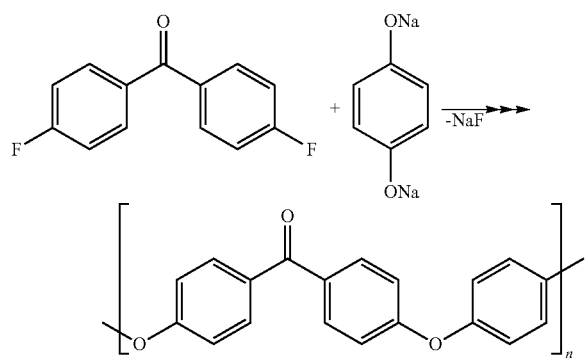

This compound also has excellent mechanical and chemical properties at high temperatures (with low degradation at high temperatures).

In the case of having the encapsulated sensor, the hollow space inside the capsule is preferably filled with the mass of polymeric material indicated above.

In the case of the sensor formed by two portions, it is particularly advantageous that the electrical connections are part of a plurality of LC circuits connected in cascade to one another, where the detection circuit is suitable for detecting the resonance of the plurality of LC circuits at a pre-established signal. In fact, in the case of a sensor formed by two portions, a signal which has been transmitted through wireless connection must reach the sensing electric circuit. To that end, it is suitable for this signal to be a variable signal. This signal is preferably the signal referred to as Sinc (which is the signal corresponding to (sen(x))/x). In turn, the detection circuit will be able to detect the resonance of the LC circuits at the Sinc signal. Advantageously, the detection circuit is suitable for processing the signal received from the sensing electric circuit through a Fast Fourier Transform (FFT). Each of the LC circuits preferably has L=22 pH and C=470 nF. In turn, the Sinc signal preferably has a frequency comprised between 1 kHz and 100 kHz, and very preferably comprised between 4 kHz and 10 kHz. It is particularly advantageous that the frequency is 5 kHz. Therefore, the returning induced impulse is received with maximum energy and power, which makes the processing thereof through Fast Fourier Transform easier.

The wireless interconnection means and the second wireless interconnection means each preferably comprise a ferrite core. Ferrite cores have low mechanical resistance so they can be damaged if subjected to the aggressive environment of the wear element. To that end, advantageously each of the ferrite cores is at one end of the corresponding portion (specifically at the ends which are facing one another) and is protected from the outside by a sheet of ceramic material, preferably alumina. Advantageously, the sheet of ceramic material is adhered onto a silicone-based adhesive sealant cushion (such as for example, the one marketed by Dow Corning® with the name 7091 Adhesive Sealant), performing the functions of keeping the system sealed against external aggressions (dust, moisture, etc.) and of absorbing blows and/or vibrations that may affect both the integrity of the ferrite and the integrity of the ceramic sheet itself which acts as a protection for the assembly at the open end thereof.

Alternatively, other materials, such as, for example, permanent magnets, can be used.

The ferrites are preferably round which allows maximizing the field lines with the lowest losses possible, minimizing the energy cost and allowing communication with the smallest space possible. With this geometry, even in the case of breakings during use thereof, the field lines are not dispersed significantly and communication can continue to take place.

The ferrite cores preferably have a groove in the outer perimeter thereof housing a coil. The size necessary for housing the ferrite core is therefore maximally reduced. Advantageously, the coil is made with Litz wire.

The sensor preferably has an antenna arranged at the rear end of the sensor. In fact, in the case of the monoblock sensor this position is the position closest to the area of attachment between the wear element and the corresponding support. There is usually a clearance in this area of attachment through which the radio-frequency signal can be transmitted. Advantageously, the antenna has a zig-zag shape, i.e., it is formed by a first plurality of segments parallel to one another attached by a second plurality of segments also parallel to one another and forming a non-zero angle with the first plurality of segments. An antenna with performances equivalent to a monopole but with a considerably shorter length is therefore achieved.

The wear sensor preferably additionally comprises an additional sensor, particularly a temperature sensor, a pressure sensor, an accelerometer and/or a gyroscope. A series of common elements (such as the data transmission circuit and the electronics which will manage the sensor in general) can therefore be used. Advantageously, the wear sensor also comprises a positioning system, such as for example, a GPS- or RFID-type positioning system, making the positioning thereof if the wear element detaches itself easier. Therefore, its collection is made easier and the possibility of damaging other machines or installations, such as crushers, etc., is prevented.

In any case, the wear sensor can itself be used for detecting the fall-off of the wear element, thereby making its collection easier to prevent it from damaging other machines such as the crushers, etc. In fact, the fall-off of the wear element will cause in any case a "change in state" (lack of communications between wear sensor and the outside, lack of communication between the two portions of the wear sensor) which will be able to be recognized as a fall-off of the wear element.

Advantageously, the wear sensor comprises consumption reduction means suitable for periodically activating the sensor from a low consumption mode to an active mode and returning the sensor to the low consumption mode. In fact, one of the limitations that the sensor probably has is the energy available. On the other hand, it is not necessary for the information on the state of wear to be transmitted continuously or with a high frequency over time. To that end, it is advantageous for the wear sensor to be in a "sleep" state for a certain time period after which it "wakes up", detects the level of wear, transmits same outwardly and returns to the sleep state. In fact, it is even possible to envisage an alternative in which, upon waking up, it detects the level of wear and only transmits same if there has been a significant change with respect to the last data sent outwardly or if it detects that the tooth has fallen off, for example.

Advantageously, the sensor comprises energy storage means, preferably a battery. Therefore, the sensor can act in a completely autonomous manner with respect to the outside. Alternatively or additionally, the sensor can include energy harvesting means.

Wear elements are usually stored for rather long time periods after manufacture. Due to space (and cost) limitations, the battery will have a limited capacity, so the sensor being deactivated while it is not installed in the machine is of interest. To that end, it is advantageous for the sensor to comprise connection means for connection of the battery suitable for being activated from the outside.

Another object of the invention also relates to a wear element of a bucket of an earth moving machine characterized in that it comprises a wear sensor according to the invention.

The wear element preferably has a rear end suitable for being assembled on the bucket or on a support fixed to the bucket, where the rear end has an inner surface which, in the assembled position, is facing the bucket or the support, and has a opening extending from the inner surface towards the inside of the wear element, and the sensor is housed in the opening. This solution will be explained with more detail below.

Another object of the invention is an assembly formed by a wear element of a bucket of an earth moving machine and a support of the wear element, where the wear element has a rear end suitable for being assembled on the support and the support has a front end suitable for being assembled on the wear element, where the rear end has an inner surface which, in the assembled position, is facing an inner surface of the front end of the support, and comprises a sensor formed by two portions according to the invention. Preferably, the inner surface of the wear element has an opening extending from the inner surface towards the inside of the wear element and the first portion of the sensor is housed in this opening, and the inner surface of the support has a second opening extending from the inner surface of the support towards the inside of the support and the second portion of the sensor is housed in this second opening. Advantageously, the support comprises a third opening suitable for housing a retaining pin of the wear element in the support and the second opening is communicated with the third opening through a communication opening. This communication opening allows the transmission through radio-frequency to be established through the clearances existing between the retaining pin and the third opening. To that end, also in this case it is advantageous for the sensor to have the antenna arranged at the rear end of the sensor, specifically at the rear end of the second portion of the sensor and, particularly, next to the communication opening.

Finally, another object of the invention is the use of a wear sensor according to the invention for determining the wear of a wear element in a bucket of an earth moving machine.

BRIEF DESCRIPTION OF THE DRAWINGS

Other advantages and features of the invention are shown based on the following description in which preferred embodiments of the invention are described in a non-limiting manner in reference to the attached drawings.

The drawings show:

FIG. 9 shows a top plan view of the first portion of the sensor of FIG. 6, without the capsule.

FIG. 10 shows a top plan view of the second portion of the sensor of FIG. 6, without the capsule.

DETAILED DESCRIPTION OF SEVERAL EMBODIMENTS OF THE INVENTION

Figure 13:
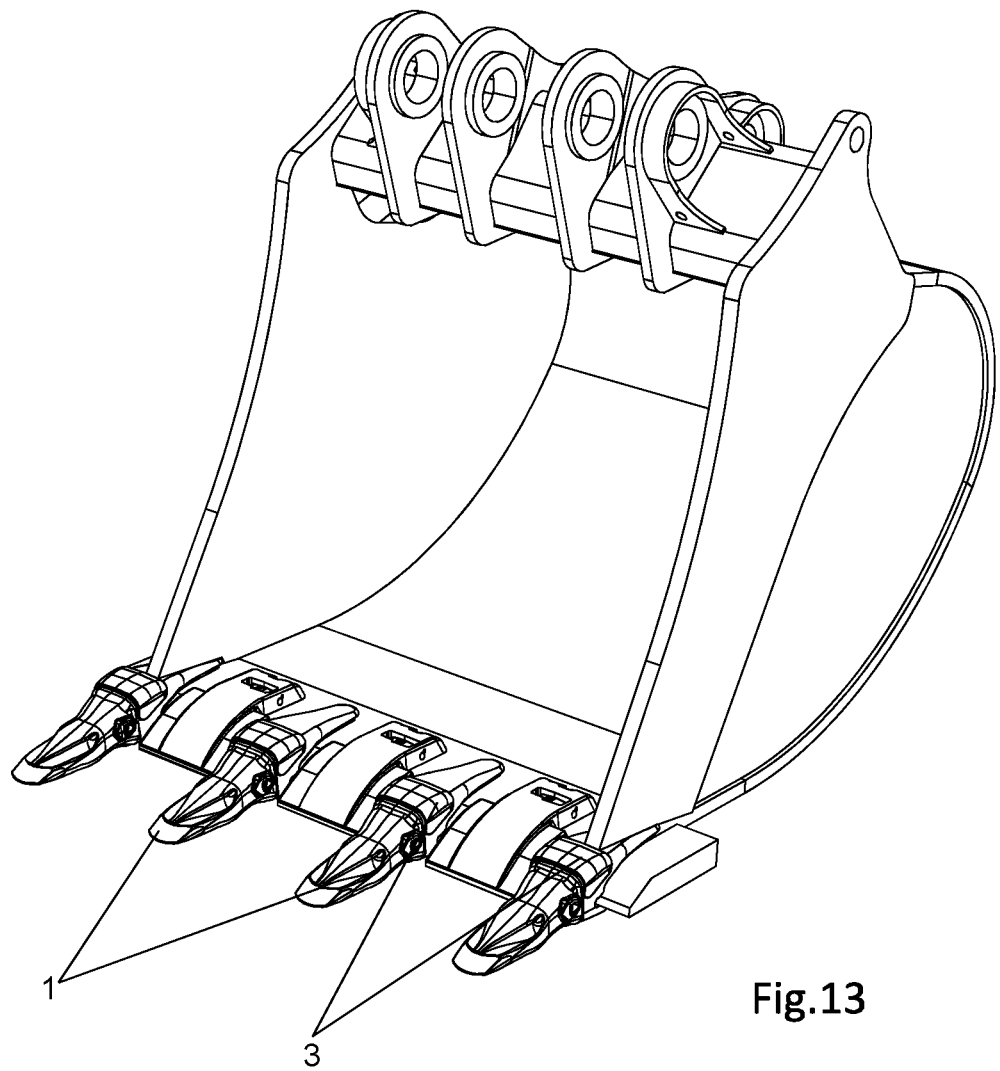
FIG. 13 shows a perspective view of a shovel with a plurality of supports and wear elements assembled on its lip.

FIGS. 1 to 5 show a first embodiment of the present invention. A tooth 1 is assembled on a conventional support or adapter 3 which is in turn suitable to be assembled on the lip of a shovel of an earth moving machine or the like (see FIG. 13). The tooth 1 is the wear element according to the present invention. The tooth 1 has in its rear end a housing in which a nose 7 located at the front end of the support 3 is housed. The housing has an inner surface 9 which, in the assembled position, will face an inner surface 11 of the nose 7. In the present description and claims it has been indicated that the inner surface 11 of the nose 7 is "inner" because it is isolated from the environment in the assembled position and not because it is a concave-type surface. In the case of the inner surface 9 of the housing of tooth 1, the term "inner" is also because the surface is isolated from the environment in the assembled position although, in the present case, it is also a convex surface. Therefore, in the case of other geometric solutions for coupling between the tooth and the support (for example the tooth has a nose and the support a housing), it must always be understood that the inner surfaces are those which are not in contact with the environment in an assembled position.

There is an opening 13 on the inner surface 9 of the housing of the tooth 1 in which the wear sensor is housed. In this embodiment, the wear sensor is a monoblock sensor, i.e., it is formed by a single part. The wear sensor comprises a capsule 15 inside which there are housed a printed circuit board 17 and a battery 19. The entire hollow space available in the capsule 15 is filled with a polymeric material, such that both the printed circuit board and the battery 19 are embedded in the mass of polymeric material. The capsule 15 has substantially an elongated cylindrical shape with a closed end, although other geometries, such as for example, with a square cross-section, also are possible. The other end has been closed by means of a cover 21.

The printed circuit board 17 is conceptually divided into two portions, the control portion, which is close to the cover 21 and the sensing portion which is close to the closed end of the capsule 15. The sensing portion is the portion comprising the sensing electric circuit which is formed by a plurality of resistances connected in parallel to one another. The sensing portion is elongated and extends to the closed end of the capsule 15 thus defining the arm 23. The resistances are physically arranged at the end of the sensing portion close to the control portion, i.e., in the base 25 of the arm 23, whereas a plurality of electrical connections 27 (establishing parallel electrical connection of the resistances) extend, each of them, a different length along the arm 23.

As the tooth 1 wears away, the end of the sensor will also wear away, such that electrical connections 27 will be cut away. This will cause the equivalent resistance of the assembly of resistances connected in parallel to gradually change depending on the number of electrical connections 27 cut away. The control portion comprises a detection circuit suitable for allowing a specific current to go through the sensing electric circuit and suitable for detecting the voltage in terminals of the assembly of resistances. The value of the equivalent resistance can therefore be determined and, as a result, the number of electrical connections 27 being cut away can be known.

Figure 1:
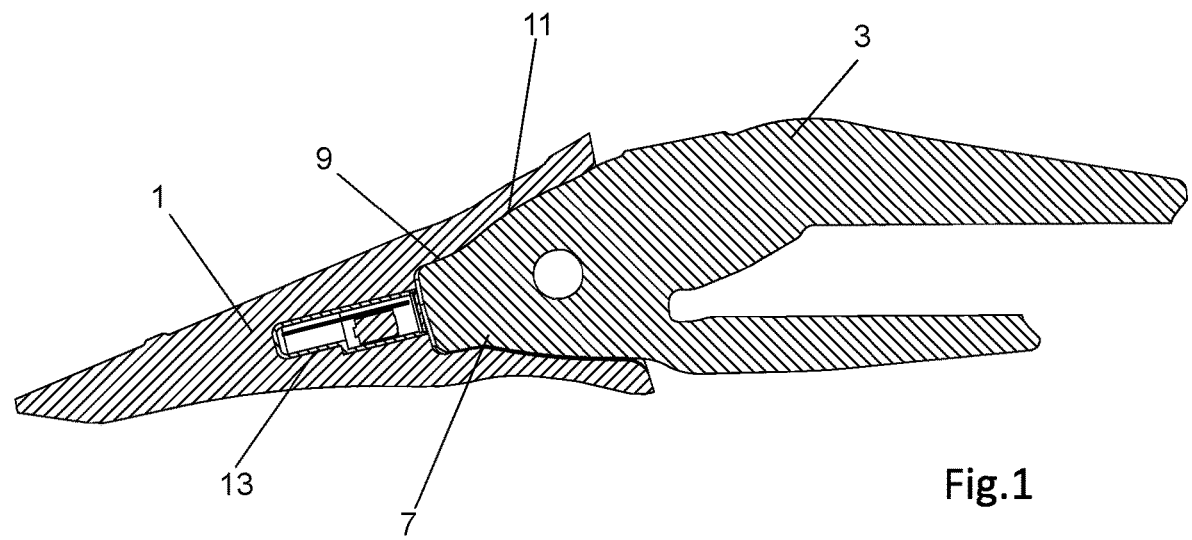
FIG. 1 shows a sectioned side elevational view of a first embodiment of an assembly formed by a wear element, its support and a wear sensor according to the invention.
Figure 2:
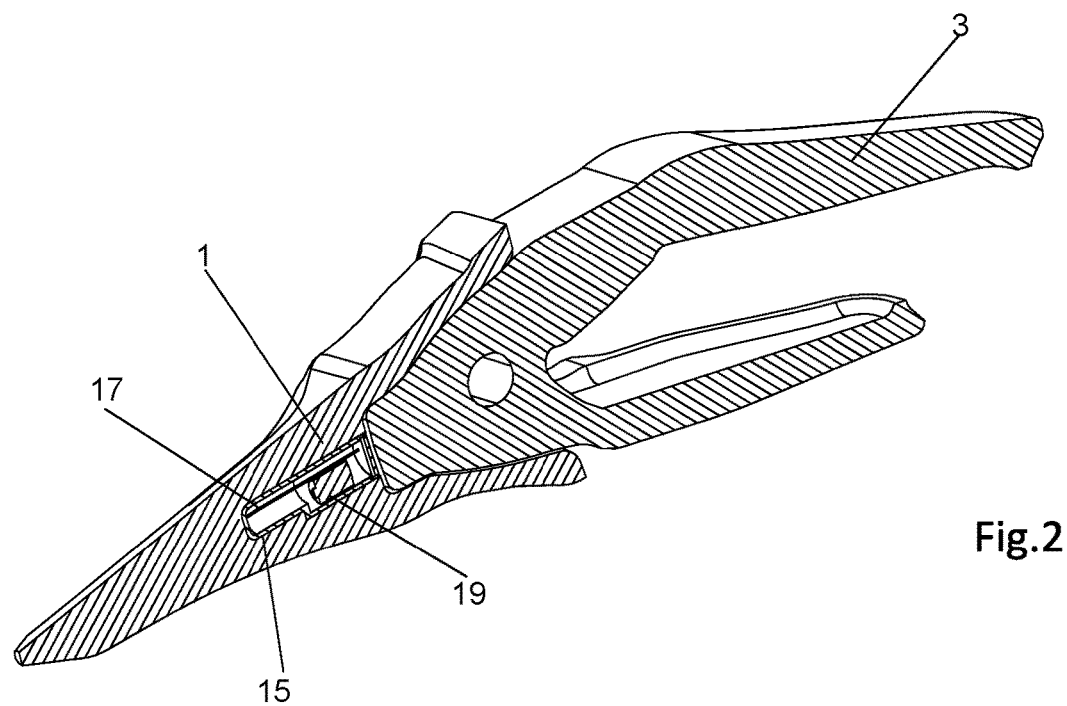
FIG. 2 shows a perspective view of the section of the assembly of FIG. 1.
Figure 3:
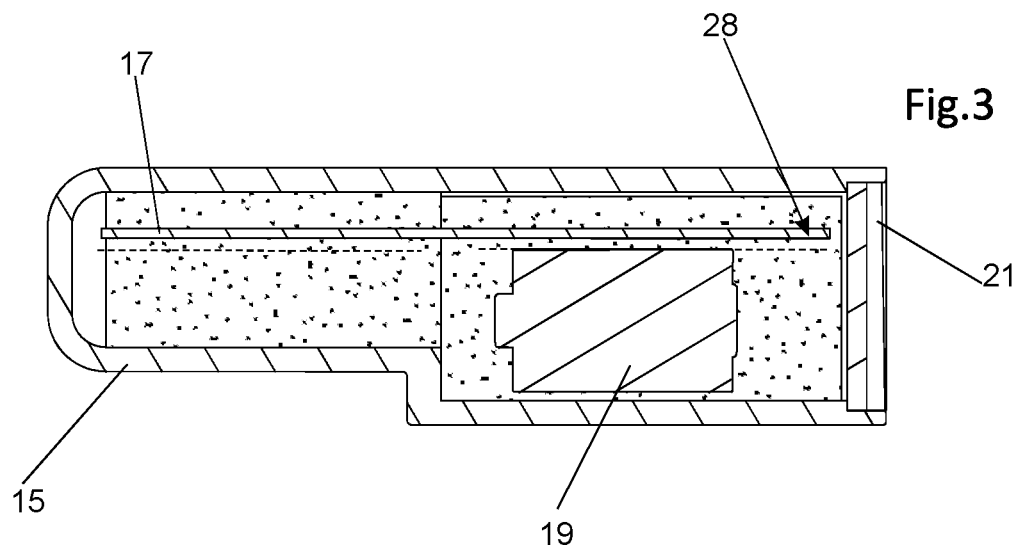
FIG. 3 shows a schematic side elevational view of the sensor of FIG. 1.
Figure 4:
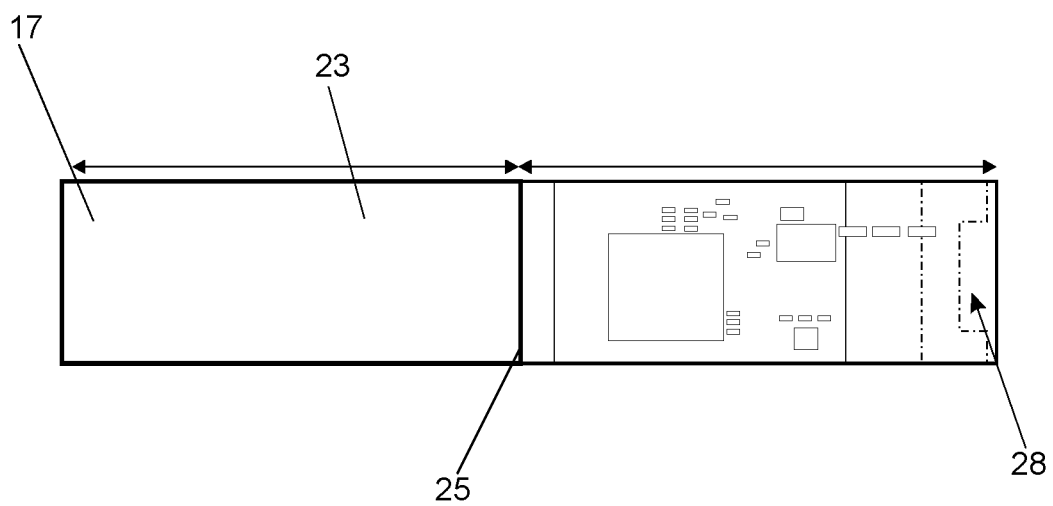
FIG. 4 shows a top plan view of the sensor of FIG. 1, without the capsule.
Figure 5:
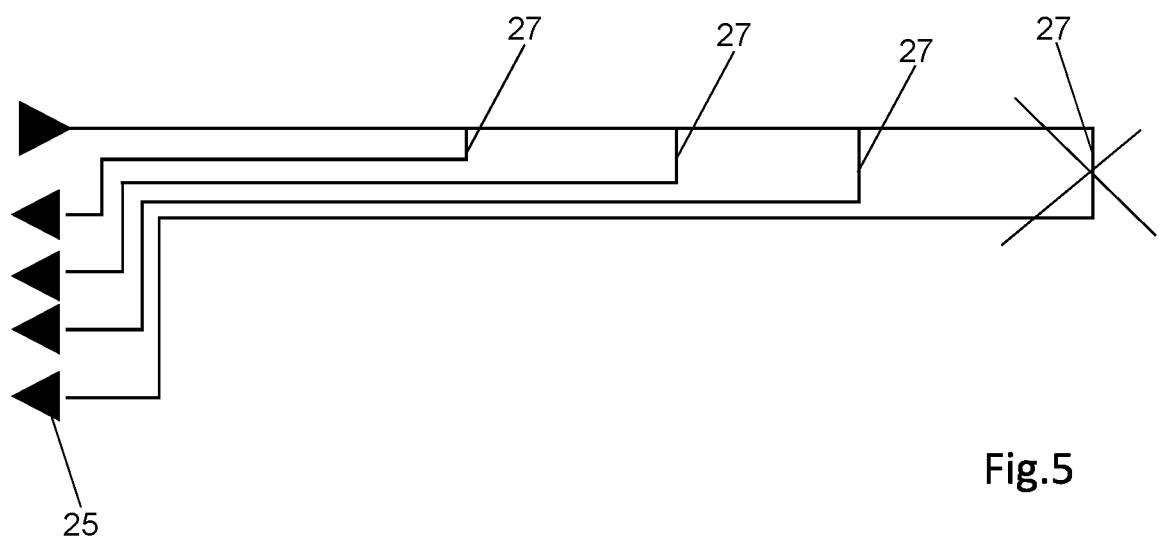
FIG. 5 shows a wiring diagram of the sensing electric circuit of the sensor of FIG. 1.
Figure 6:
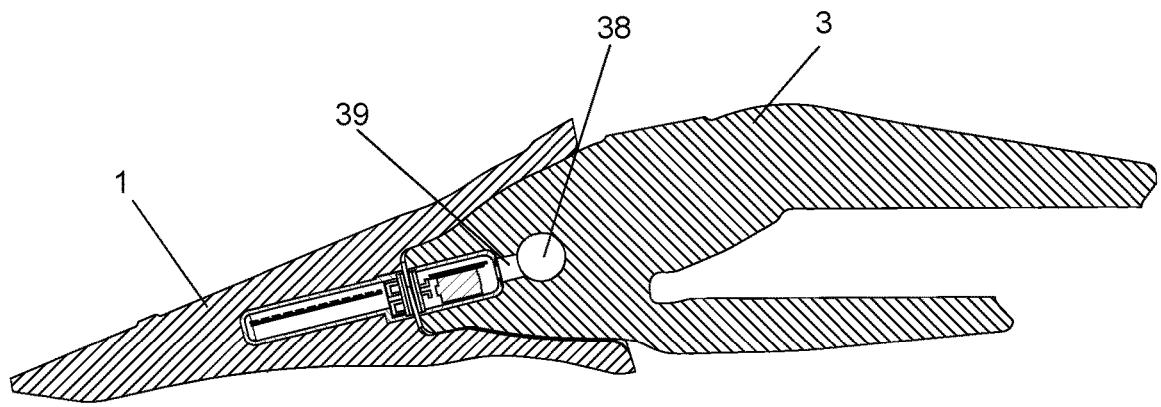
FIG. 6 shows a sectioned side elevational view of a second embodiment of an assembly formed by a wear element, its support and a wear sensor according to the invention.
Figure 7:
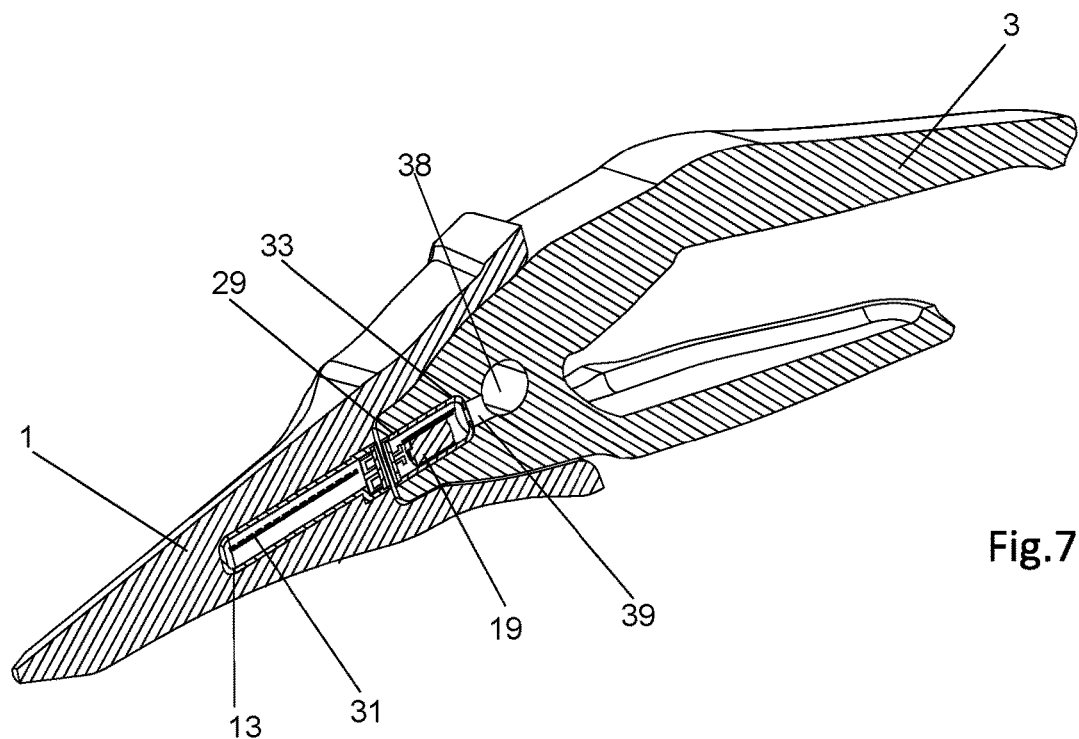
FIG. 7 shows a perspective view of the section of the assembly of FIG. 6.
Figure 8:
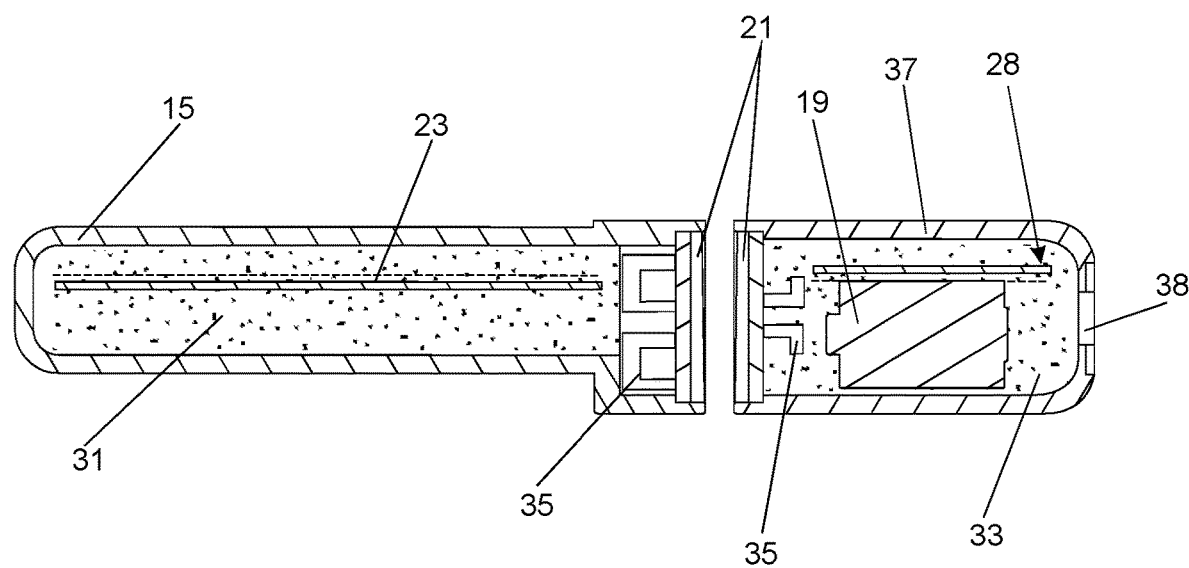
FIG. 8 shows a schematic side elevational view of the sensor of FIG. 6 which is formed by a first portion and a second portion.

In the wiring diagram of FIG. 5, an electrical connection 27 eliminated due to wear has been marked with a cross. The equivalent resistance of the assembly connected in parallel will be different than that before eliminating this electrical connection 27.

The control portion further comprises a data transmission circuit, an antenna 28, a battery 19 as well as other elements necessary for the correct operation of the sensor. The antenna 28 is arranged at the rear end of the control portion, i.e., close to the inner surface 9 of the housing. Therefore, transmission through radio-frequency can be established through the clearance present between the inner surface 9 of the housing and the inner surface 11 of the nose 7.

The location of the opening 13 on the inner surface 9 of the housing allows "reasonably" isolating the sensor from the aggressive environment in which the tooth 1 works.

FIGS. 6 to 12 show a second embodiment of the present invention. In a manner similar to the preceding case, a tooth 1 is assembled on a support 3 which is in turn suitable for being assembled on the lip of an excavating bucket. However, in the present case the support 3 has a second opening 29 and the sensor is made up of two portions, which are two independent parts. The first portion 31 is housed in the opening 13 of the tooth 1 whereas the second portion 33 is housed in the second opening 29 of the support 3. Both openings 13 and 29 are facing one another in the assembled position so the first portion 31 and the second portion 33 are also facing one another in the assembled position.

The first portion 31 comprises the sensing electric circuit which, like in the preceding case, is formed by a substantially elongated printed circuit board defining the arm 23. In this case, instead of resistances arranged in parallel, the sensing electric circuit comprises a cascade of LC circuits. A plurality of electrical connections which will be those that will be cut away as the wear of the tooth 1 progresses extend along the arm 23. The sensing electric circuit is enclosed by a capsule 15 and the hollow space between the capsule 15 and the printed circuit board is filled with a polymeric material.

The detection circuit, the data transmission circuit, the antenna 28, the battery 19 and the remaining elements necessary for the correct operation of the sensor are in the second portion 33. Given that there is no electrical connection between the first portion 31 and the second portion 33, each of them comprises a ferrite core 35, forming the wireless connection means and the second wireless connection means. The ferrite core 35 of the first portion 31 is arranged at the rear end thereof, whereas the ferrite core 35 of the second portion 33 is arranged at the front end thereof, such that, in the assembled position, both ferrite cores 35 are facing one another and are the closest possible to one another. The second portion 33 is housed in a second capsule 37 and the hollow space between the second capsule 37 and the printed circuit board is also filled with a polymeric material.

The open end of the capsule 15 and the open end of the second capsule 37 are closed by covers 21 which, in this case, are made of a ceramic material, such as for example, alumina. This is due to the fact that in the present alternative these covers 21 must protect the very delicate ferrite cores 35.

In this second embodiment, the antenna 28 is again at the rear end of the sensor, specifically at the rear end of the second portion 33. This end is close to a third opening 38 arranged in the support 3 on which the tooth 1 is assembled. To fix the tooth 1 on the support 3, a retaining pin is inserted through openings arranged on both sides of the tooth 1, the retaining pin being housed in the third opening 38. For the purposes of the present invention, the orientation of the pin is not relevant and, they can be arranged vertically, for example, i.e., in a position rotated 90° with respect to the position shown in the drawings. The clearance present between the retaining pin, the support 3 and the tooth 1 is sufficient to allow the passage of the radio-frequency signal. To that end, the support 3 has the second opening 29 communicated with the third opening 38 through a communication opening 39 making the transmission of the radio-frequency signal from the antenna 28 to the third opening 38 and from thereon to the outside easier.

Figure 11:
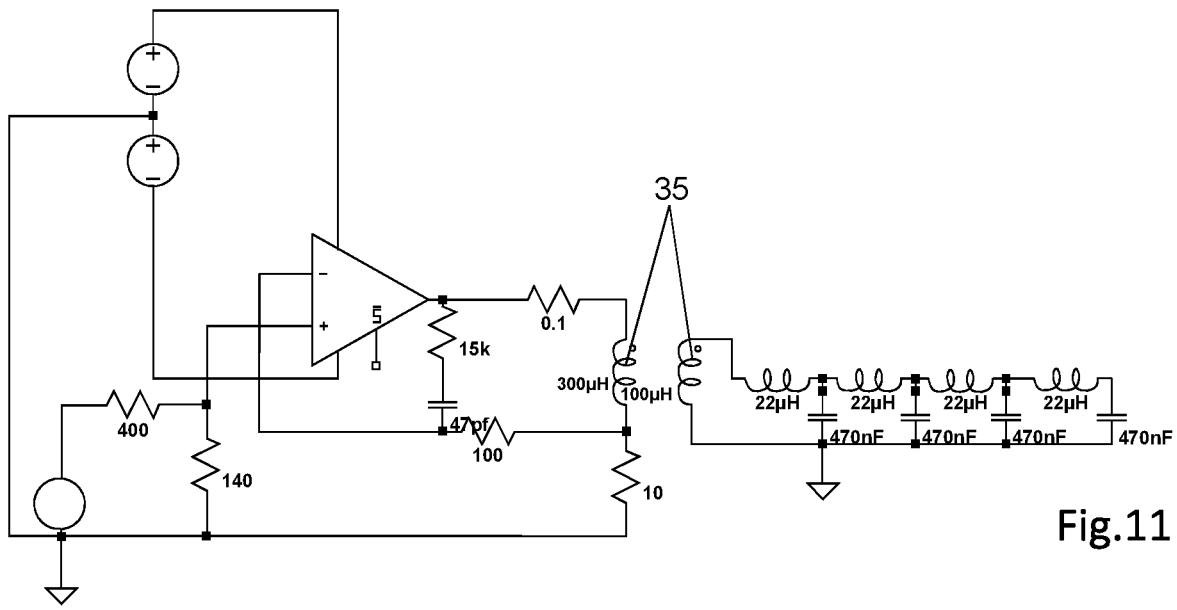
FIG. 11 shows a wiring diagram of the sensing electric circuit, the wireless connection means and the second wireless connection means of the sensor of FIG. 6, in a new condition.
Figure 12:
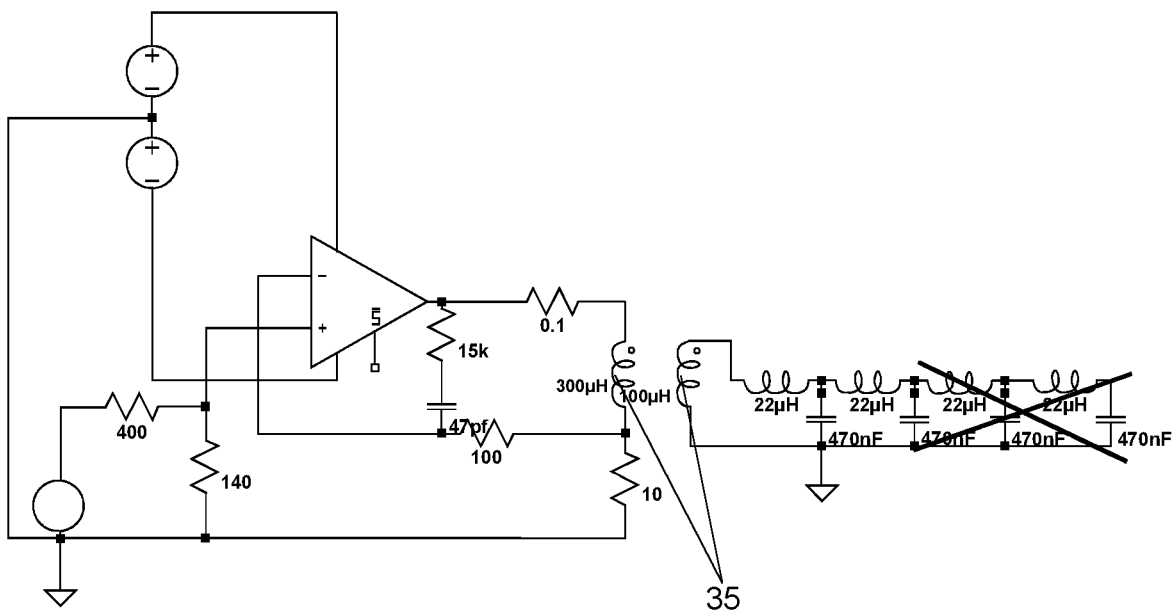
FIG. 12 shows the wiring diagram of FIG. 11, in a partially worn away condition.

The wiring diagrams of FIGS. 11 and 12 allow seeing the corresponding portion of the sensing electric circuit on the right of the diagram and the wireless connection means and the second wireless connection means with the corresponding ferrite cores 35 in the central part. In FIG. 12, two LC circuits which have been destroyed due to wear were marked with a cross. The response of the sensing electric circuit of FIGS. 11 and 12 to a specific input signal (for example, a Sinc signal) will be different in both cases, so the sensor will be able to known the level of wear of the wear element.

Figure 14:
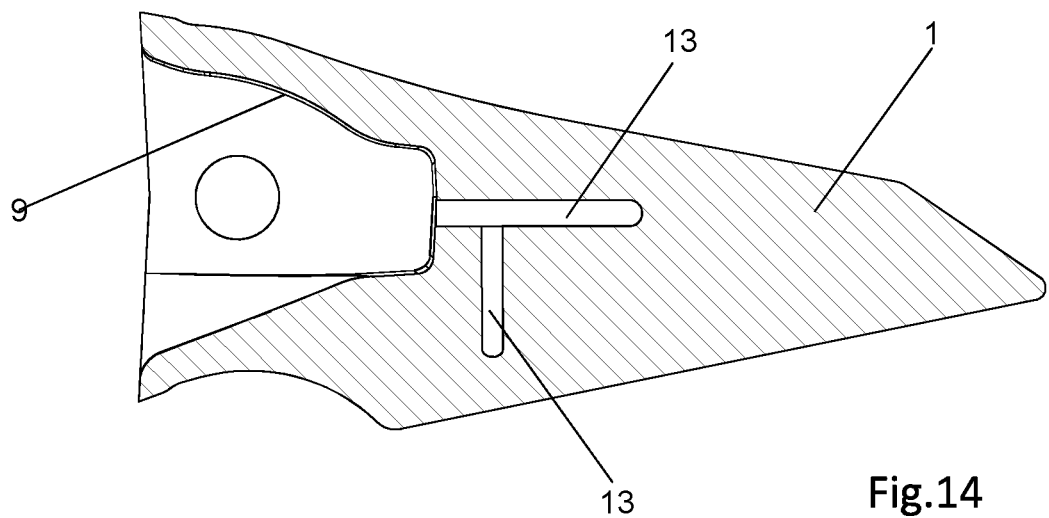
FIG. 14 shows a sectioned side elevational view of a third embodiment of a wear element according to the invention.

FIG. 14 shows another embodiment of the invention. In this case, the wear sensor has two arms extending in two different directions (which can be perpendicular but could also form an acute angle between them). The wear of the wear element in two different directions can therefore be controlled. This solution is compatible both with the monoblock alternative and with the alternative consisting of a sensor formed by two physically independent parts.

The invention claimed is:
1. A wear sensor for a wear element in a bucket of an earth moving machine that comprises a sensing electric circuit and at least one elongated arm extending in a direction of detection defining a longitudinal axis, said elongated arm having a base and an end, where said end is suitable for being worn together with the wear material of the wear element, where said elongated arm comprises a plurality of electrical connections forming part of said sensing electric circuit and extending different lengths with respect to one another, measured according to said longitudinal axis along said arm, said sensor being formed by two portions which are two physically independent parts, where a first portion comprises said elongated arm and wireless interconnection means and a second portion comprises a detection circuit suitable for detecting the failure of each of said electrical connections, a data transmission circuit with a radio-frequency emitter, where said radio-frequency emitter emits in a frequency comprised between 50 MHz and 990 MHz, and second wireless interconnection means suitable for establishing a wireless connection with said wireless interconnection means, wherein said electrical connections are part of a plurality of LC circuits connected in cascade to one another, where said second portion is able to transmit a pre-established signal to said sensing electric circuit through said second wireless interconnection and said wireless interconnection, said pre-established signal is a variable signal, said detection circuit is suitable for detecting the resonance of said plurality of LC circuits at said pre-established signal.

2. The sensor according to claim 1, wherein said elongated arm has between 3 and 7 of said electrical connections extending different lengths with respect to one another along said arm, measured according to said longitudinal axis.

3. The sensor according to claim 1, wherein said radio-frequency emitter emits in a frequency comprised between 150 MHz and 950 MHz and preferably at 433 MHz.

4. The sensor according to claim 1, wherein each of said LC circuits has L=22 μH and C=470 nF.

5. The sensor according to claim 1, wherein said detection circuit is suitable for generating a Sinc signal.

6. The sensor according to claim 5, wherein said Sinc signal has a frequency comprised between 1 kHz and 100 kHz, preferably comprised between 4 kHz and 10 kHz.

7. The sensor according to claim 1, wherein said detection circuit is suitable for processing the signal received from said sensing electric circuit through a Fast Fourier Transform.

8. The sensor according to claim 1, wherein said wireless interconnection means and said second wireless interconnection means each comprises a ferrite core.

9. The sensor according to claim 8, wherein each of said ferrite cores is at one end of the corresponding portion and is protected from the outside by a sheet of ceramic material, preferably alumina.

10. The sensor according to claim 8, wherein said ferrite cores have a groove in the outer perimeter thereof housing a coil.

11. The sensor according to claim 10, wherein said coil is made with Litz wire.

12. The sensor according to claim 1, further comprising a temperature sensor, a pressure sensor, an accelerometer, a gyroscope or a positioning system.

13. Use of a wear sensor according to claim 1 for determining the wear of a wear element in a bucket of an earth moving machine.

14. A wear element of a bucket of an earth moving machine, where it comprises the first portion of a sensor according to claim 1.

15. The wear element according to claim 14, having a rear end suitable for being assembled on said bucket or on a support fixed to said bucket, where said rear end has an inner surface which, in the assembled position, is facing said bucket or said support, characterized in that it has an opening extending from said inner surface towards the inside of the wear element and the sensor is housed in said opening.

16. An assembly formed by a wear element of a bucket of an earth moving machine and a support of said wear element, where said wear element has a rear end suitable for being assembled on said support and said support has a front end suitable for being assembled on said wear element, where said rear end has an inner surface which, in the assembled position, is facing an inner surface of the front end of the support, wherein it comprises a sensor formed by two portions according to claim 1.

17. The assembly according to claim 16, wherein the inner surface of the wear element has an opening extending from said inner surface towards the inside of the wear element and the first portion of the sensor is housed in said opening, and the inner surface of the support has a second opening extending from said inner surface of the support towards the inside of the support and the second portion of the sensor is housed in said second opening.

18. The assembly according to claim 17, wherein said support comprises a third opening suitable for housing a retaining pin of said wear element in said support, and in that the second opening is communicated with said third opening.

* * * * *